L. J. WHITLOCK.
TEMPERATURE MODERATOR FOR ORCHARDS AND THE LIKE.
APPLICATION FILED DEC. 31, 1919.

1,398,927.

Patented Nov. 29, 1921.
2 SHEETS—SHEET 1.

INVENTOR:
Lester J. Whitlock,

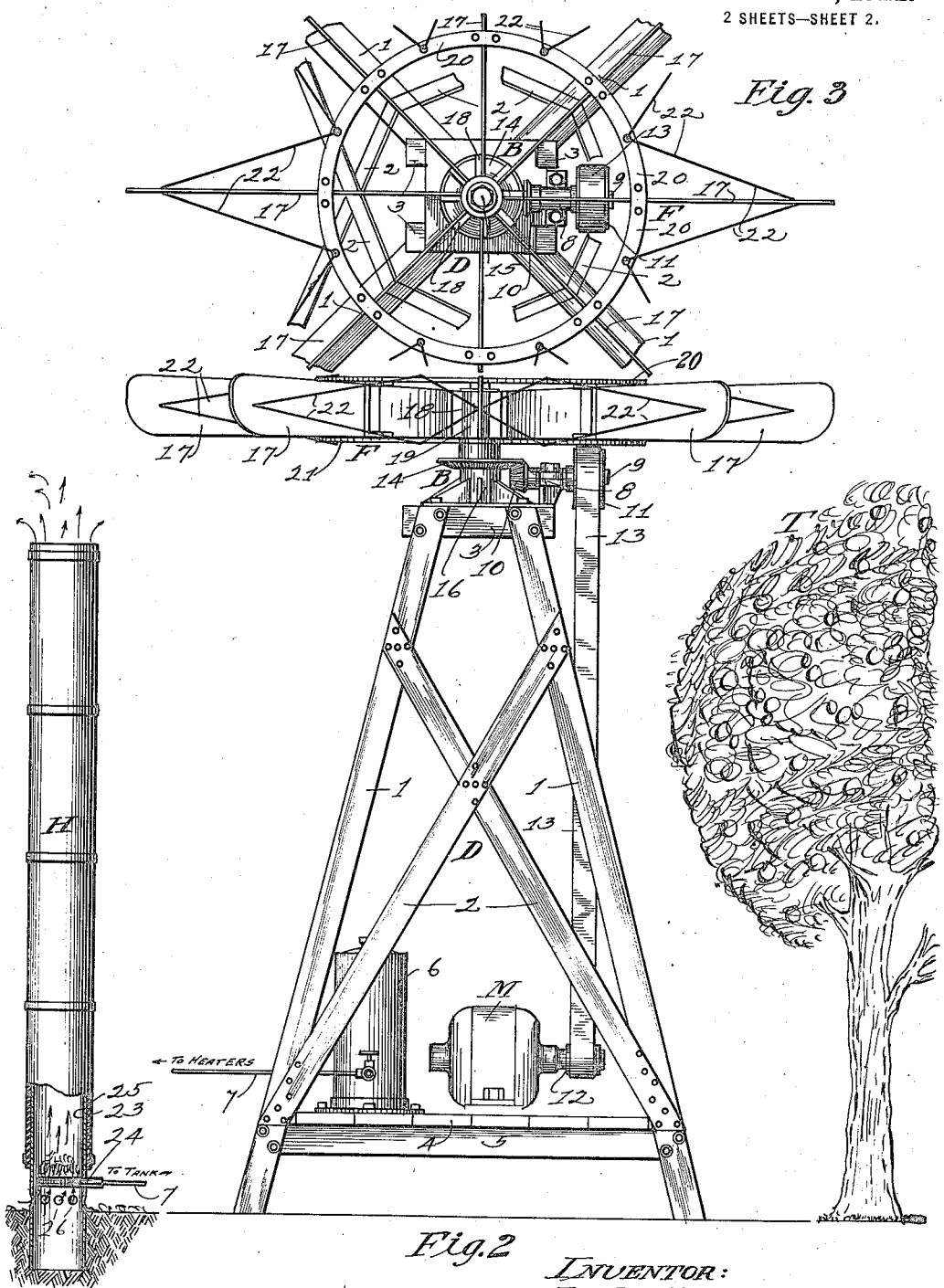

UNITED STATES PATENT OFFICE.

LESTER J. WHITLOCK, OF POMONA, CALIFORNIA.

TEMPERATURE-MODERATOR FOR ORCHARDS AND THE LIKE.

1,398,927. Specification of Letters Patent. Patented Nov. 29, 1921.

Application filed December 31, 1919. Serial No. 349,838.

*To all whom it may concern:*

Be it known that I, LESTER J. WHITLOCK, a citizen of the United States, and a resident of Pomona, in the county of Los Angeles and State of California, have invented new and useful Improvements in Temperature-Moderators for Orchards and the like, of which the following is a specification.

My invention relates to and has for a main object the provision of a device and system for substantially raising the temperature of orchards for preventing damage by frost and cold weather.

It is a well known fact that frost only occurs in still weather and when moisture in the air is prevalent, and an object of this invention, therefore, is first to agitate the air and set up currents around or above the tops of the trees as a first and preliminary means of dissipating the frost.

As a further and separate means of dissipating the frost, if any, and of preventing the frost in the vicinity of the trees, it is an object to provide a plurality of heaters of suitable character and positioned at intervals around the air agitating means described, so that the air currents set up, as stated, may serve to distribute the heat from said heaters over and around the trees.

Other objects will appear as the description of my invention progresses.

Referring to the drawings forming a part of this application and appended hereto:

Fig. 2 is an enlarged elevation of a derrick and fan for setting up currents of air, one of the heaters for heating the air and one of the trees of the orchard; said derrick, heater and tree being shown in relatively proper positions with special regard to their height;

Fig. 3 is a fragmentary plan of the fan and derrick;

I have employed similar characters of reference throughout the specification and in the several views of the drawing for indicating the same and like parts, and will now describe my apparatus and system of heating in detail, using said reference characters.

Figure 1:
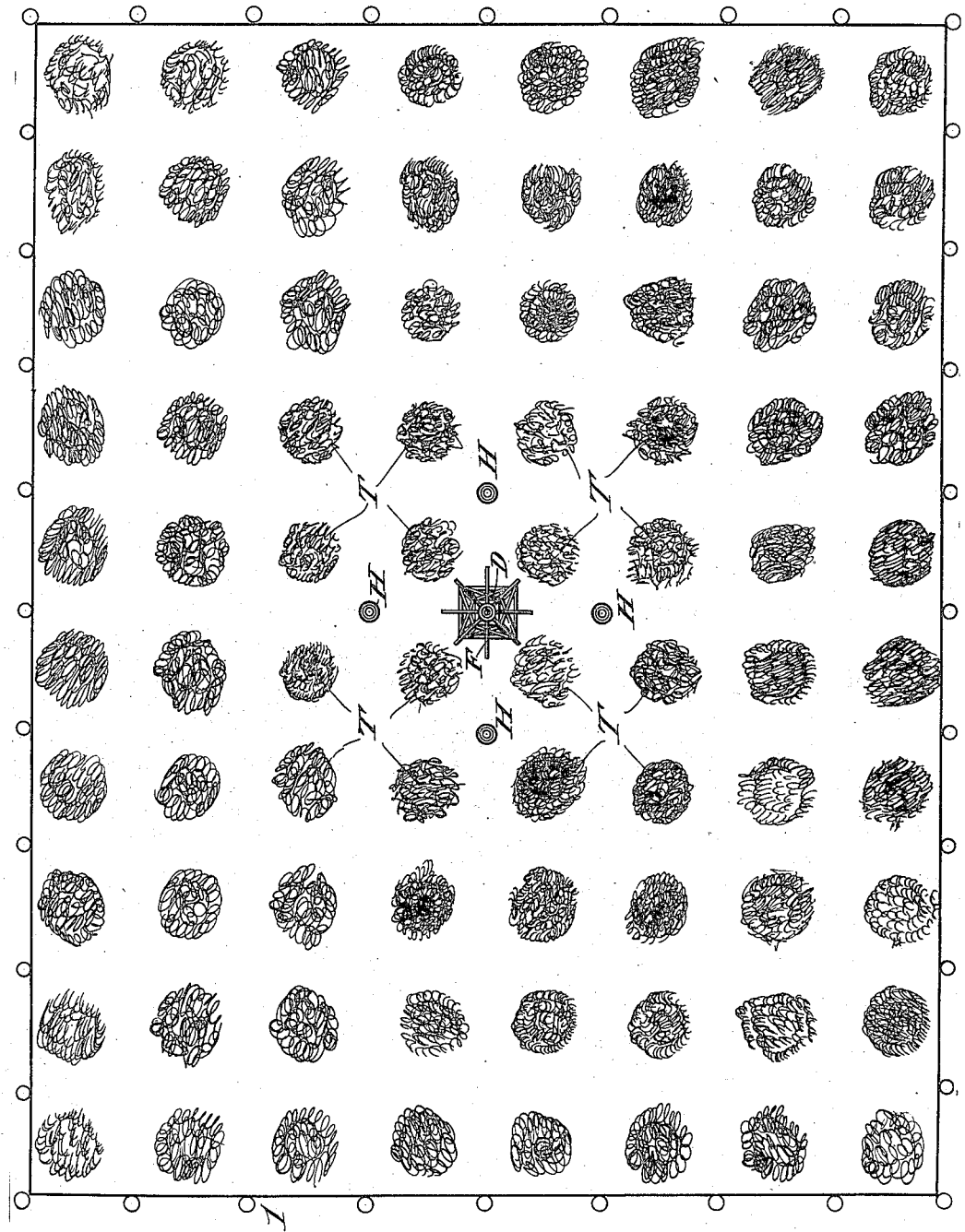
Figure 1 is a plat of an orchard showing the air agitating and heating means hereinbefore mentioned arranged in a suitable manner therein.

I have shown a familiar type of derrick D, having inclined standards 1, 1, 1, 1, at the corners and braces 2, 2, etc., connecting said standards diagonally, and top members 3, 3, etc., for connecting said standards. A floor 4 may be provided at or near the bottom on beams 5, on which floor I may provide a fuel tank 6 having a fuel supply pipe 7, leading therefrom and a motor M, as shown in Fig. 2.

At the top of the derrick, I have shown a base plate, or member B attached to the members 3, 3, and having a bearing 8, either formed thereon or carried thereby. A shaft 9 is rotatably held in said bearing and carries on one end a bevel gear 10 and on the other a pulley 11, and said pulley may be connected with a pulley 12 on motor M, by means of a belt 13, as shown.

Gear 10 meshes with and drives a relatively large bevel gear 14 which is held on a stud, or shaft 15 carried in a bearing 16 centrally formed on member B. The upper portion of stud, or shaft 15 carries a fan F having a plurality of vertical blades, or vanes 17, 17, attached at their inner ends to lugs 18, 18, of a hub portion 19, and braced midway of their inner and outer ends by means of annular rings 20 and 21 attached to each of said blades at the upper and lower edges, respectively, or otherwise. The outer ends of said blades may be additionally braced by means of guy rods or wires 22, 22, etc., connecting the ends of the blades with the rings 20 and 21, or otherwise. The fan F is mounted at the top of the derrick D at a suitable level, either above or near the tops of the trees T, T, etc., or lower, if desired, and the derrick and fan are positioned, preferably, in the exact center of a grove of 5 acres. This is clearly shown in Fig. 1, in which figure it will be observed that said fan and derrick are centrally positioned between four of the uniformed spaced trees of an orchard, while in the centers of the adjacent spaces, I provide heaters H, H, etc., of the character shown in Fig. 2.

Said heaters comprise, preferably, a stack 23 of metal suitably supported on or embedded as shown at its lower end in the ground and having burner 24, centrally held therein and connected by means of the pipe 7, with the fuel tank 6 on the derrick. I cover the exterior of each of the stacks 23 with a suitable thickness of insulation 25 of asbestos or the like so as to prevent the radiation of heat from the stack at the sides. The lower portion of the stack, however, for a substantial distance from the ground is free from said insulation, as shown in Fig. 2, so as to provide means for admitting air from the atmosphere to the stack for creating a draft therein. This is accomplished by means of a provision of a plurality of peripheral apertures 26, 26, etc., in the stack 23, and the air, it will be readily observed, will thus be drawn into the stack at the bottom and the draft therein will draw the heat from the stacks at their tops, the heaters being of slightly less height than the fan F, as shown, and the heat thus discharged from the stacks will be distributed over and around the trees by means of the currents of air set up by the operation of the fan F.

It is obvious that, as night air is of greater humidity than day air and night air also has the greater advantage, generally, of being free from air currents prevalent in the daytime, the heat generated from the heaters H, H, etc., will be readily dissipated and distributed over the orchard for a given radius in substantially level strata, or at least, more so than would be possible in the daytime. For this purpose, the heights of trees, fan and heaters being as shown, it is essential that the blades of fan F be vertical, as shown, in order that the air currents set up thereby may be substantially horizontal.

From experience in the use of my apparatus and system, I have found that a device of the character described and approximating the relative dimensions and heights shown will serve a tract of about 5 acres effectively. Thus, it will be apparent that a great amount of expense will be saved orchardists in the use of my system over the commonly used and so-called "smudging systems." The fan may be operated by electric and gas motor, as desired at a relatively low cost over the cost of the necessary number of smudge pots for an orchard of the same size, and only a few heaters will be required to heat the orchard by my system.

Of course, it will be understood that I have shown only one form of apparatus for carrying out the objects of this invention and that other forms of apparatus may be used with equally good results for the same purpose, without enlarging the scope or departing from the spirit of my invention.

What I claim is:

1. A temperature moderator for orchards and the like comprising a horizontally rotatable fan disposed at a height greater greater than the trees, a supporting frame for said fan, a plurality of heating stacks apart from and surrounding said frame, open at their upper ends, a burner within each stack whereby heated air is delivered from the open end of said stack, and means for rotating said fan whereby air currents are set up to distribute the heated air throughout the orchard.

2. A temperature moderator for orchards and the like comprising a plurality of vertical heating stacks disposed substantially in a circular path about a common center, a burner in each stack whereby heated air emanates from the upper ends of the stacks, a horizontal rotatable fan disposed centrally of said plurality of stacks adapted to set up horizontal air currents to distribute the heated air, a supporting frame adapted to hold said fan at a height above the trees, and means for rotating said fan.

3. In a temperature moderator for orchards, a vertical supporting frame, a horizontally rotatable fan supported by said frame, a plurality of heating elements surrounding said frame and spaced therefrom, each of said heating elements comprising a fuel burner, a vertical stack surrounding said burner having inlet ports therein disposed below the burner, said stack being open at its upper end whereby heated air is delivered therefrom when the burner is in operation, said open ends being disposed below said fan, and means for rotating said fan whereby air currents are set up to disseminate the heated air throughout the orchards.

Signed at Pomona, in the county of Los Angeles and State of California, this 3 day of December, 1919.

LESTER J. WHITLOCK.

In presence of—
 FRANK M. ELY,
 MARY A. BENNETT.